May 7, 1946.   L. RADFORD   2,400,060
INSTRUMENT FOR MEASURING RANGE
Filed Sept. 15, 1931   3 Sheets-Sheet 1

INVENTOR.
Lawrence Radford
BY
ATTORNEYS.

May 7, 1946. L. RADFORD 2,400,060
INSTRUMENT FOR MEASURING RANGE
Filed Sept. 15, 1931 3 Sheets-Sheet 2

INVENTOR.
Lawrence Radford
BY
ATTORNEYS.

May 7, 1946.　　　　　L. RADFORD　　　　　2,400,060
INSTRUMENT FOR MEASURING RANGE
Filed Sept. 15, 1931　　　3 Sheets-Sheet 3

INVENTOR.
Lawrence Radford
BY
ATTORNEYS.

Patented May 7, 1946

2,400,060

UNITED STATES PATENT OFFICE 2,400,060

INSTRUMENT FOR MEASURING RANGE

Lawrence Radford, Washington, D. C.

Application September 15, 1931, Serial No. 562,987

12 Claims. (Cl. 88—2.7)

(Granted under the act of March 3, 1883, as amended April 30, 1928; 370 O. G. 757)

The object of this invention is to provide an improved and more accurate means for the determination of the range to a distant object which is situated below the horizontal plane passing through the instrument, by measuring the angle of depression, below said horizontal plane, of the line of sight to said object. Other objects are to provide a range finding instrument that is more convenient to use and to provide an improved and convenient method of reading the range directly and without computation.

The principle upon which this invention is based is that if the operator of the instrument observes a distant object at a lower level, i. e. at a lesser distance above sea-level than that of the instrument, the horizontal distance from a point directly beneath the instrument to the object is a function of the difference in altitudes of the instrument and the object, the angle of depression of the line of sight from the instrument to the object and, if the distance is considerable, of the radius of the earth. Thus, if the instrument is being used in an aircraft to measure the distance from a point at sea-level directly beneath the aircraft to an object at sea-level, such as a ship, said distance is a function of the height of the aircraft above sea-level, of the angle of depression of the line of sight to said object with reference to the horizontal plane passing through the instrument, and of the radius of the earth.

The construction and operation of one embodiment of the invention will be understood by reference to the accompanying drawings and the description which follows.

Fig. 1a is a representation of the field of view as seen by one looking into the eye-piece of the instrument.

Figure 1:
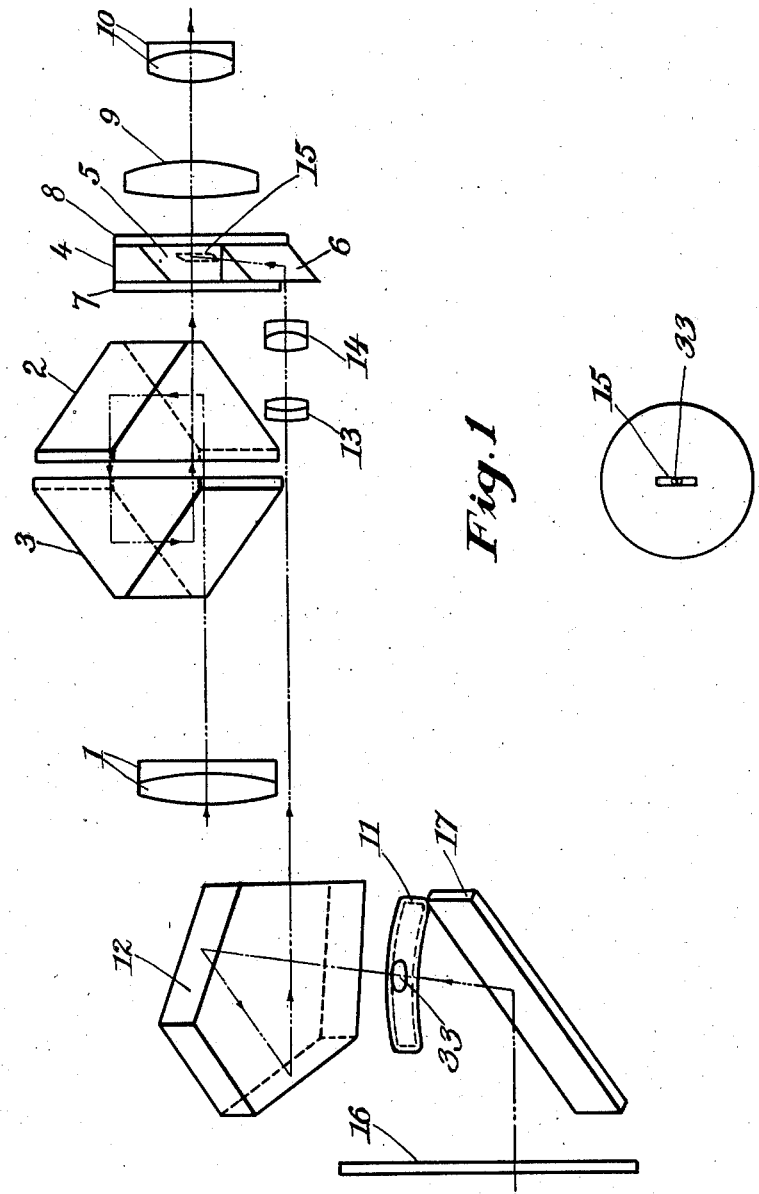
Fig. 1 is a general arrangement view of the optical parts, in perspective.

Referring first to Fig. 1, rays of light from the distant object enter the objective lens 1, which forms an image of the object in the focal plane of the objective lens. These rays of light, before reaching the focal plane, pass through the prisms 2 and 3. These two prisms taken together comprise the well-known Porro prism system, the function of which is to erect the image both laterally and vertically. The focal plane of the objective 1 lies within the prism system composed of prisms 4, 5 and 6 and the two circular plane-parallel plates 7 and 8, all of which are cemented together. The horizontal cross-section of prism 5 is a rhomboid, and two of the vertical surfaces of this prism, which surfaces are in contact with prisms 4 and 6 respectively, are inclined at approximately 45° to the parallel faces of the plates 7 and 8. The only function of prism 4 is to fill the space between plates 7 and 8 and prism 5, and it is shaped accordingly. Prism 6 fulfills the same function as prism 4, i. e. it fills the space between plates 7 and 8 on the other side of prism 5, but this prism 6 also extends beyond the periphery of the plates 7 and 8, and this extension terminates in a vertical polished reflecting surface parallel to the interface of prisms 4 and 5. The function of this projection and reflecting surface will be explained later.

The image formed by objective 1 is viewed by means of the ocular system consisting of lenses 9 and 10, and therefore the operator of the instrument, on looking into this ocular system sees an erect image of the object toward which the instrument is directed.

Rays of light which pass through the spirit level 11 are twice reflected in prism 12 and enter the lens 13. From lens 13 these rays enter lens 14. These two lenses together form an image of the bubble 33 in the spirit level. The rays after leaving lens 14 are reflected at the inclined reflecting surface in which the extension of prism 6 ends, so that, after reflection, they proceed in a direction approximately perpendicular to the axis of the ocular system 9 and 10. At the interface between prisms 4 and 5 is provided a narrow rectangular strip of silvering 15, with its longer edges vertical. This strip 15 is so positioned that its center lies on the axis of the ocular system 9 and 10, which is also the axis of the rays from objective 1 after emergence from prism 3. The axis of the rays from lens 14, after reflection at the reflecting surface of prism 6, also intersects the center of this strip of silvering, and these rays are reflected thereby. Hence, since the axis of lenses 13 and 14 is parallel to the axis of the ocular system 9 and 10, and since, as already stated, the surface of the strip of silvering 15 is parallel to the reflecting surface of prism 6, the rays from lens 14, after being twice reflected as already described, enter the ocular system 9–10 parallel to and co-axial with the rays from objective 1.

The image of the bubble 33 in the spirit level 11, formed by lenses 13 and 14, is at the same distance from lens 9 as the image formed by objective 1, and hence the observer looking into the ocular system 9—10 sees a field which has the appearance as shown in Fig. 1a. The observer will see the image 33 of the bubble in spirit level 11 in a narrow vertical rectangular strip in the center of the field of view, this strip being defined by the silvering 15, and in the remainder of the field of view the observer will see the image of the object toward which the instrument is directed, the image being formed by objective 1.

The spirit level 11 is illuminated by daylight that enters the instrument through window 16, which is mounted in the case of the instrument, and this light is reflected by mirror 17 on the under side of the spirit level, which is translucent.

It is obvious that, as would be the case with any telescope, when the instrument is inclined downward, i. e. the objective end depressed, the image of an object, as formed by objective 1 and seen in the field of view on looking into the ocular 9—10, will appear to move upward in the field. Also it is obvious that, when the instrument is inclined as described, the bubble will move in the spirit level 11 toward the ocular end of the instrument. By reason of the double reflection in prism 12 and the action of lenses 13 and 14, when the instrument is inclined as described, the motion of the bubble in the spirit level causes upward motion of the image of the bubble in the central strip in the field of view, i. e. in the same direction as the motion of the image of the aforesaid object. Furthermore, the relation of the focal length of objective 1, the radius of curvature of spirit level 11 and of the focal lengths of lenses 13 and 14 is such that the said images of bubble and object move the same distance for a given inclination of the instrument.

Figure 2:
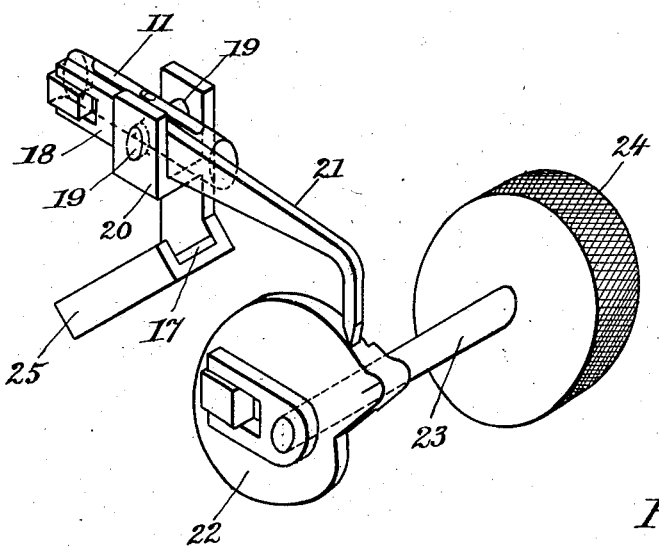
Fig. 2 is a perspective view of the spirit level, the parts whereby said level is actuated, and of the operating knob.

As will be seen by reference to Fig. 2, spirit level 11 is mounted in a holder 18 which is rotatably supported, by means of the pivots 19—19, in the bracket 20, which bracket is secured to the case of the instrument. The axis of rotation of the spirit level holder 18 is perpendicular to the axis of objective 1 and is horizontal when the longer edges of the silver strip 15 are vertical. The cam-follower 21 is rigidly attached to holder 18 anad rotates therewith. This cam follower 21 is of the form shown and terminates in a sharp edge which is kept in contact with the periphery of cam 22 by means of a spring which is not shown. This cam 22 is non-rotatably attached to a shaft 23 which is rotatable in bearings in the case of the instrument, the axis of rotation of this shaft being parallel to that of the spirit level holder 18. The operating knob 24 is non-rotatably secured to the other end of shaft 23. The mirror 17 is secured in a holder 25.

Figure 3:
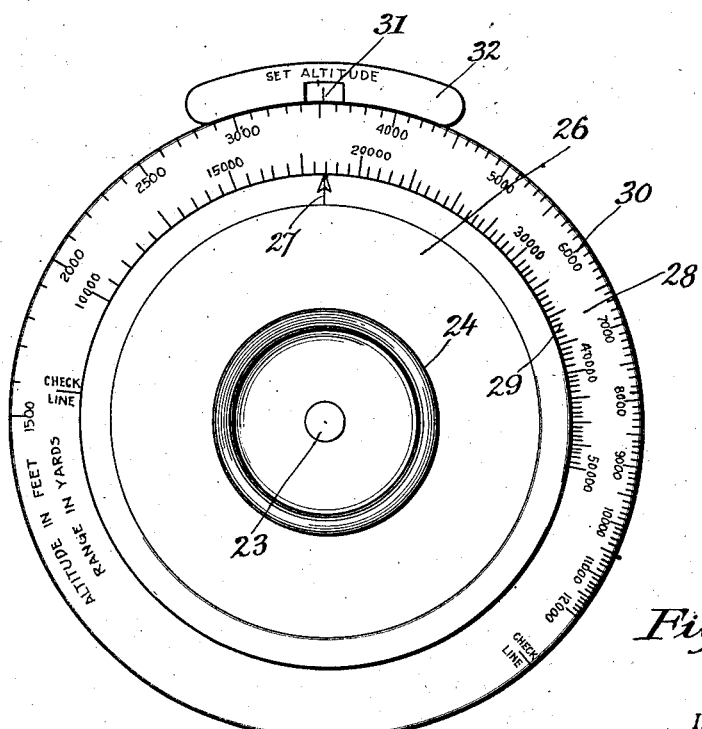
Fig. 3 is a view of the scales on the instrument.

Referring now to Fig. 3, there is secured to shaft 23, so that it rotates therewith, a disk or dial 26, the edge of which is beveled, and on this bevel surface is engraved a mark 27. A ring 28 is so mounted on the case of the instrument that it may be rotated by hand, independently of shaft 23, but about the same axis of rotation as the shaft. On the exposed surface of ring 28, near the inner edge thereof, are engraved a series of radial marks and numbers which comprise a scale, 29, representing the various distances which the instrument is designed to measure. On the same surface of ring 28, adjacent the outer edge thereof, is engraved a second scale, 30, representing the various altitudes at which the instrument is designed to be used. A mark 31 is engraved on a plate 32 secured to the case of the instrument to serve as a reference by which scale 30 is set, as described hereinafter. The disk 26 carrying the mark 27, the two scales 29 and 30 on ring 28, and the fixed mark 31, taken together, comprise a compound circular slide rule whereby the desired range may be readily computed.

As pointed out above, the distance from a point directly below the instrument and on the same level as the distant object, to said object, is a function of the difference in altitudes of the instrument and the object, of the angle of depression of the line of sight from the instrument to the object (with reference to a horizontal plane through the instrument) and also, if the distance be large, of the curvature of the earth. The relation between these quantities may be expressed by the equation:

$$D = \tan^{-1} \frac{2rH + R^2}{2rR} - 257.83 \frac{R}{r} \quad (1)$$

wherein

D = angle of depression of line of sight from instrument to object (with reference to horizontal plane through instrument).
r = radius of earth.
H = difference in altitude of instrument and object.
R = horizontal range from point beneath instrument to said object, measured at level of object.

Obviously the above equation 1 is not adapted fo ready solution by means of a slide rule. An equation, however, of the form:

$$R^K = \frac{H^P}{C \tan D} \quad (2)$$

wherein C, K and P are constants, is susceptible of ready solution by means of a suitable slide rule. Moreover, I have determined that if proper values are assigned to constants C, K and P, the use of an equation of this form for computing the value of R yields results of satisfactory accuracy for the range of galues of H and R at which it is desired to use the instrument.

It is obvious from Fig. 2 and the construction already described that rotation of knob 24, and therefore of cam 22, causes the inclination of the spirit level 11 to change, and therefore causes the image of the bubble in the spirit level to move up or down in the central rectangular strip in the field of view. Hence, when the instrument is pointed toward a distant object, so that the image of the object can be seen in the field of view, the operator of the instrument can, by rotation of knob 24, cause the image of the bubble to move up or down in the field of view until the center of said image appears to be in line horizontally with the image of said object. The cam 22 is of such form, and the scales 29 and 30 on the ring 28 are so graduated, that rotation of knob 24 as already described, and rotation of ring 28 as described hereinafter, enables the operator to read the desired range directly by means of scale 29 and the index mark 27. The cam 22 is so cut that the angle of rotation of shaft 23, and therefore of disk 26 necessary to bring the center line of the bubble into coincidence with the datum line of observation, is proportional to log tan D, where D is the angle of inclination of spirit level 11 with respect to the line of sight from the instrument to the aforesaid object, which angle is equal to the angle of depression of the line of sight. Scale 29 is graduated proportional to K log R and scale 30 is graduated proportional to P log H, the constants K and P having the same values as in Equation 2 above.

Figures 4, 5:
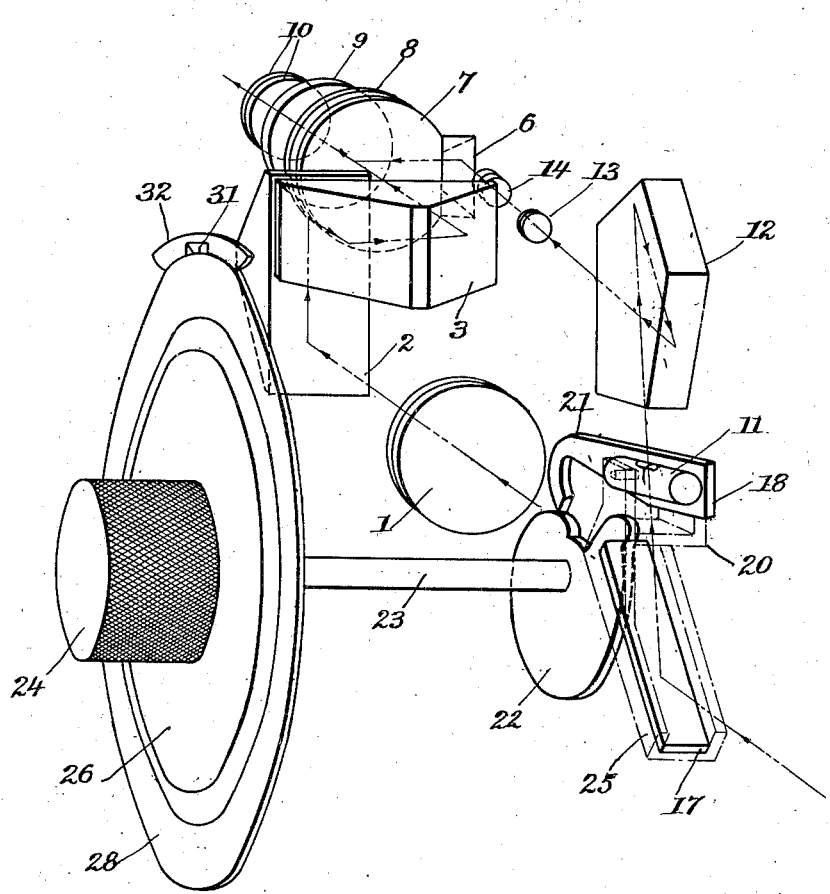
Fig. 4 is a general arrangement view, also in perspective, of all the parts shown in the other figures.
Figure 5 is a view of the prism system in the focal plane of the ocular.

The parts shown in Figs. 1, 2 and 3, and described above, are also shown, in their relative positions, in Fig. 4. These parts, with the exception of knob 24, dial 26, ring 28 and plate 32, are all mounted in a casing or housing, which has been omitted from the figures to avoid complication or confusion.

The instrument which has just been described is operated in the following manner. Let it be assumed, as an example, that the instrument is being used in an airplane to measure the distance, measured at sea level, from a point at said level directly below the airplane, to a distant object at sea level, for instance a ship. The observer, while looking into the ocular, directs the instrument so that the image of said object is seen in the field of view and turns knob 24 until the center of the image of the bubble is in line, horizontally, with the waterline of the ship. Ring 28 is then rotated by hand until scale 30, read at mark 31, indicates the height of the instrument above sea level, this height being known from the reading of the altimeter in the airplane. Mark 27 then shows, on scale 29, the aforesaid distance to the object.

The herein described invention may be manufactured and used by or for the Government of the United States of America for governmental purposes without the payment of any royalties thereon or therefor.

I claim:

1. A range measuring instrument, comprising an optical system which includes an objective lens and a group of prisms disposed to include the focal plane of said lens, a device for determining positions with respect to horizontality, an optical system to superimpose the image of the reading of said device upon the image from said lens in the said focal plane, means to view said images, means to move said device to the horizon-determining position, and distance-indicating means operatively associated with the last mentioned means.

2. A range measuring instrument, comprising an optical system which includes an objective lens, a reflecting system to erect the images from said objective, and a group of prisms disposed to include the focal plane of said objective, a device for determining positions with respect to horizontality, an optical system to superimpose the image of the reading of said device upon the image from said objective in the said focal plane, means to view said images and distance-indicating means operatively associated with said device to indicate a distance when the device is in the horizon-determining position.

3. A range measuring instrument, comprising an optical system including an objective lens, a reflecting system to erect the images from said objective, and a group of prisms disposed to include the focal plane of said objective, a translucent spirit level, means to pass light through said level, an optical system including a doubly reflecting prism and lenses to superimpose the image of the reading of said spirit level upon the image from said objective in the said focal plane, means to view said images and distance-indicating means operatively associated with said level whereby adjustment of the level to the horizontal causes an indication of the range of the object to be given.

4. A range measuring instrument, comprising an optical system to form erected images, associated prisms disposed to include the focal plane of said system, a tiltably mounted spirit level, means to project the image of the reading of the said level into said focal plane, means including a shaft to impart tilting movement to said level, the said movement being proportional to a logarithmic tangent, and a distance indicating device operatively connected to said shaft.

5. A range measuring instrument, comprising an optical system to form an erected image, associated prisms disposed to include the focal plane of the said system, a tiltably mounted spirit level, means to project the image of the reading of said level into the said focal plane, an arm connected to said level having a deflected portion, an edge on said portion being adapted to follow the face of a cam, a cam disposed with its face contactible by said edge, the face of said cam having a contour which imparts to said arm a movement proportional to a logarithmic tangent, a rotatable shaft connected to said cam, and distance indicating means operatively related to said shaft.

6. A range measuring instrument, comprising an optical system to form erected images, associated prisms disposed to include the focal plane of said system, a tiltably mounted spirit level, a mirror to reflect light through said level, means to project the image of the reading of said spirit level into the said focal plane, an arm connected to said level having a deflected portion, an edge on said portion being adapted to follow the face of a cam, a cam disposed with its face contactible by said edge, the face of said cam having a contour which imparts to said arm a movement proportional to a logarithmic tangent, a rotatable shaft connected to said cam, a fixed index, a disk on said shaft having an indicating mark on the edge thereof, a ring rotatably mounted around said disk, an altitude scale whereof the divisions have a logarithmic spacing on the outer edge of the said ring, and a distance indicating scale whereof the divisions have a different logarithmic spacing on the inner edge of said ring.

7. A range measuring instrument, comprising an optical system to form erected images, associated prisms disposed to include the focal plane of said system, a tiltably mounted spirit level, a doubly reflecting prism mounted to receive the light from said level and reflect it toward said focal plane, an image-forming lens system in the path of light from said doubly reflecting prism, a silvered area on an interface between two of said associated prisms, one of said associated prisms being disposed to receive the light from said level and reflect it to said silvered area, said area being in the focal plane of the said optical system, an arm having a deflected portion, an edge on said portion being adapted to follow the face of a cam, a cam disposed with its face contactible by said edge, the face of said cam having a contour which imparts to said arm a movement proportional to a logarithmic tangent, a rotatable shaft connected to said cam, a fixed index, a disk on said shaft having an indicating mark on the edge thereof, a ring rotatably mounted around said disk, an altitude scale whereof the divisions have a logarithmic spacing on the outer edge of said ring, and a distance indicating scale whereof the divisions have a different logarithmic spacing on the inner edge of said ring.

8. In combination, an optical system providing one path only for light from an object to an observer, a device for determining the horizontal line through the instrument in the vertical plane that includes the line of sight to the object, means to adjust the position of said device including an element rotatable proportionally to the logarithmic tangent of the angle between said horizontal line and said line of sight, a member positively connected to said element to rotate therewith and having on it a reference mark, and an adjustable member having on one edge a logarithmic scale of altitudes and on the opposite edge a logarithmic scale of ranges operatively associated with said reference mark, whereby when said adjustable member is set to indicate the altitude of the instrument the horizontal range to said object is indicated on said range scale opposite said reference mark.

9. In combination, an optical system providing one path only for light from an object to an observer, movable means to define, in cooperation with the line of sight, the angle of depression of said line of sight, means including an element movable proportionally to the logarithmic tangent of said angle to move said movable means, a member positively connected to said element to move therewith and having on it a reference mark, and an adjustable member having on one edge a logarithmic scale of altitudes and on the opposite edge a logarithmic scale of ranges operatively associated with said reference mark, whereby when said adjustable member is set to indicate the altitude of the instrument the horizontal range to said object is indicated on said range scale opposite said reference mark.

10. In combination, means providing one path only for light from an object to an observer, a device for determining a horizontal line through said instrument, means to actuate said device including an element rotatable proportionally to the logarithmic tangent of the angle between said horizontal line and the line of sight through said first mentioned means, a member positively connected to said element to rotate therewith and having on it a reference mark, and an adjustable member having on one edge a logarithmic scale of altitudes and on the opposite edge a logarithmic scale of ranges operatively associated with said mark, whereby when said adjustable member is set to indicate the altitude of the instrument the horizontal range to said object is indicated on said range scale opposite said reference mark.

11. An instrument for measuring range, comprising means for forming an erect image of an object, means for indicating the horizontal, means for forming in the field of the said image an image of the said indicating means, means including a logarithmic cam to adjust said indicating means to a horizontal position, and means to indicate the horizontal distance to said object including an element actuated by said adjusting means and also including an element settable to the vertical height of the instrument above said object.

12. An instrument for measuring range, comprising means for forming an erect image of an object, means for indicating the horizontal, means for forming in the field of said image an image of the said indicating means, means including a logarithmic cam to adjust said indicating means to a horizontal position, and means to indicate the horizontal distance to said object including an element actuatable by said adjusting means and also including an element settable to a pre-determined value that is a function of the relative positions of said object and the instrument.

LAWRENCE RADFORD.